Dec. 14, 1954  J. F. RIGALI  2,696,905
SAWDUST FEEDER
Filed June 17, 1949  2 Sheets-Sheet 1
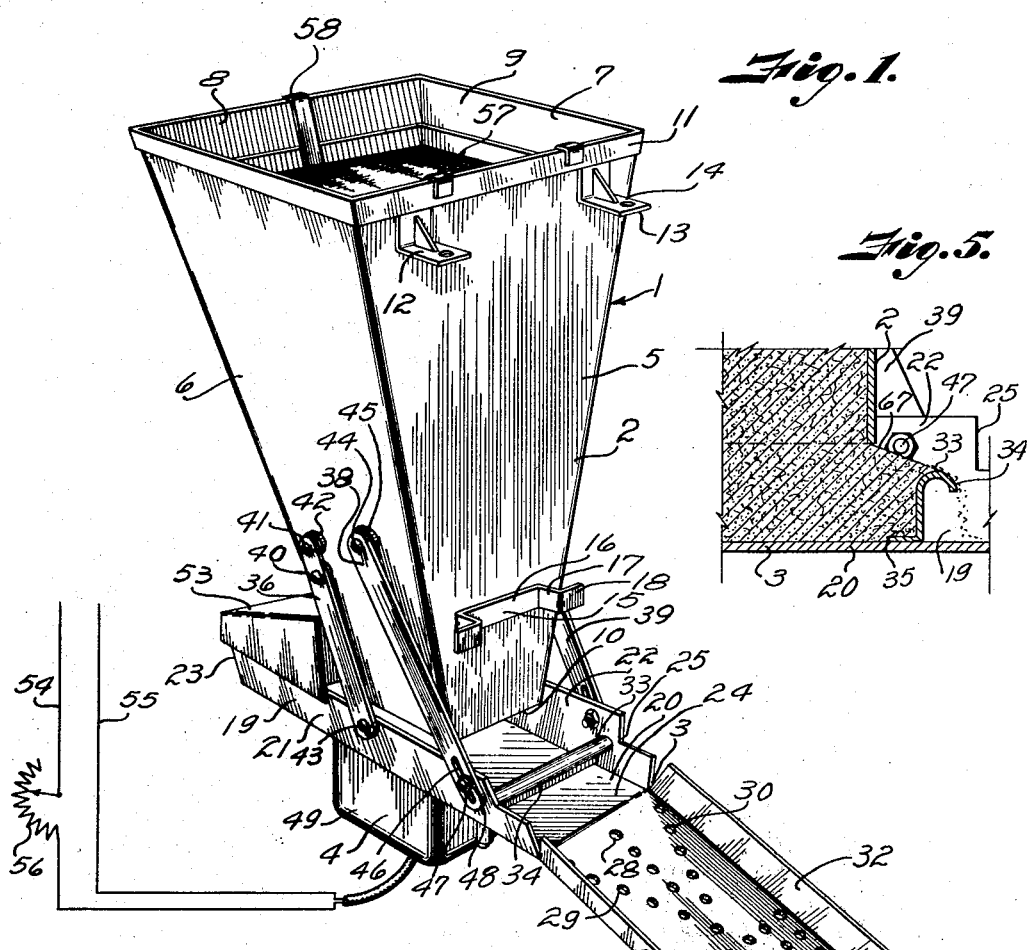
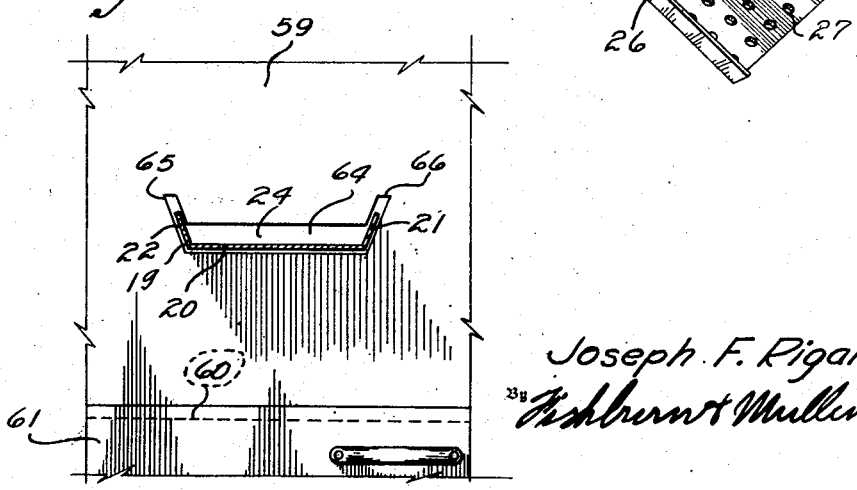
Inventor
Joseph F. Rigali
By
Attorneys

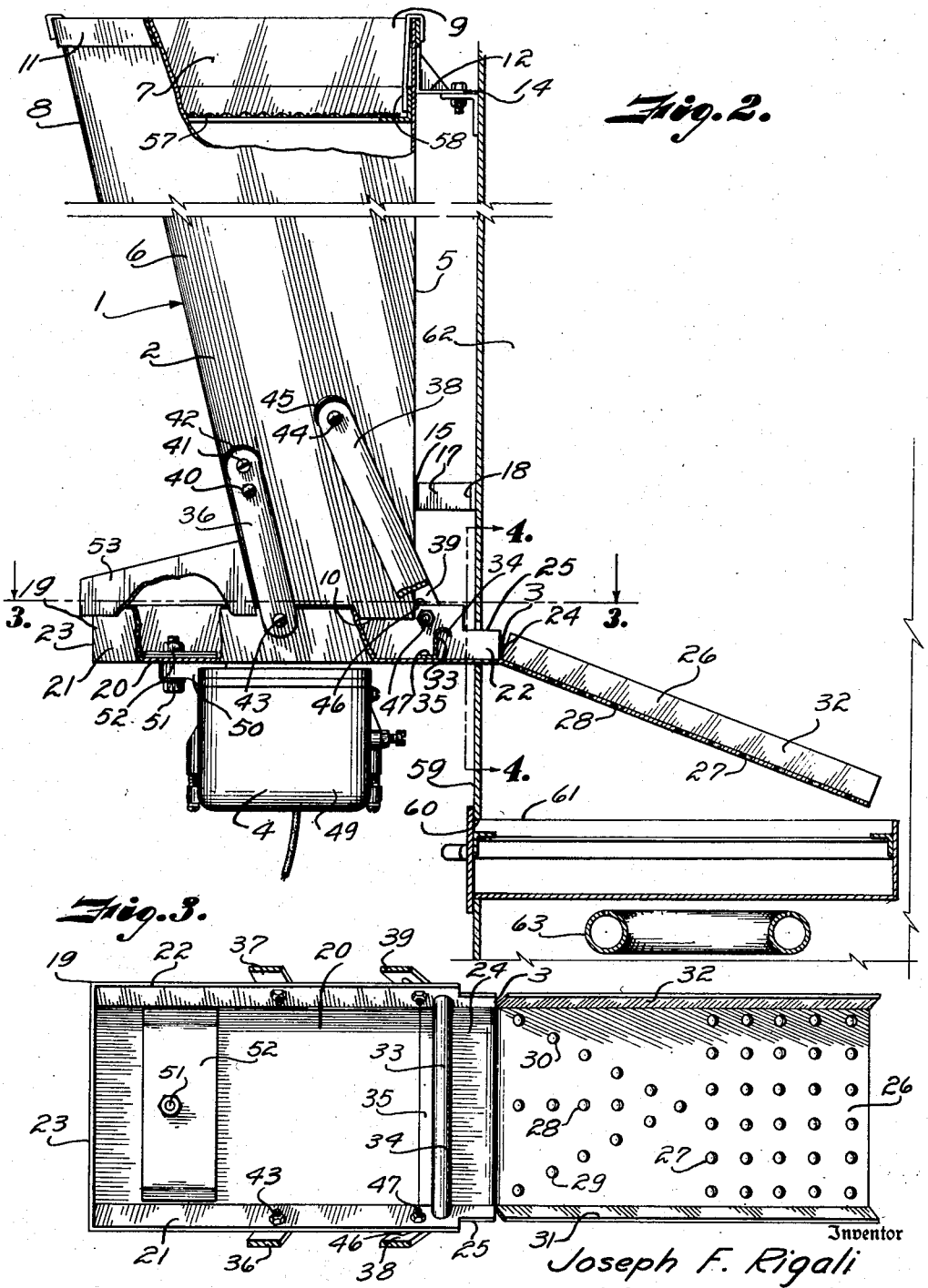

United States Patent Office 2,696,905
Patented Dec. 14, 1954

2,696,905

SAWDUST FEEDER

Joseph F. Rigali, Kansas City, Mo., assignor, by mesne assignments, to Raymond H. Starr, Kansas City, Mo.

Application June 17, 1949, Serial No. 99,689

2 Claims. (Cl. 198—56)

This invention relates to a feeder for feeding material, for example sawdust, into a smoke generator such as used in supplying smoke for curing meats and other food products. Smoke generators of this character are usually equipped with a sawdust drawer or pan in which the sawdust is converted to smoke by application of heat, the sawdust being placed in the pan and renewed from time to time. It is obvious that when the sawdust is first supplied, generation of smoke is slow until the sawdust reaches combustion temperature after which the smoke increases in volume to a maximum and then decreases to a minimum when the outer surfaces have been burned. When this occurs much of the sawdust in the interior of the sawdust bed is not burned because this portion of the sawdust becomes insulated from the heat and does not receive sufficient oxygen to permit combustion. It is further obvious that with intermittent replenishment of the sawdust, it is difficult to maintain a continuous and steady production of smoke of uniform intensity.

It is, therefore, the principal object of the present invention to provide a constant and uniform feed of sawdust into the smoke generator and at a rate to effect substantially instant combustion of the sawdust particles as they reach the zone of combustion and thereby effect a continous smoke supply of uniform density.

Other objects of the present invention are to provide a sawdust feeder that is of simple construction and installation; to provide a vibratory feeder wherein intensity of vibrations may be varied to control the rate of feed; to effect a thin uniform feed of sawdust across a distributor by which the sawdust is properly distributed into the combustion zone so as to give the best results; and to provide a feeder which is substantially free from clogging.

In accomplishing these and other objects of the invention I have provided improved structure, the preferred form of which is illustrated in the accompanying drawings wherein:

Fig. 1 is a perspective view of a sawdust feeder constructed in accordance with the present invention.

Fig. 2 is a side elevation of the feeder when attached to a smoke generator for supplying the generating pan with a continuous uniform feed of sawdust, parts of the feeder being shown in section and the smoke generator in vertical section.

Fig. 3 is a horizontal section on the line 3—3 of Fig. 2.

Fig. 4 is a cross section through the feeder on the line 4—4 of Fig. 2.

Fig. 5 is an enlarged fragmentary section particularly illustrating angularity of the discharge surface of the sawdust bed which accumulates in the feeding pan.

Referring more in detail to the drawings:

1 designates a sawdust feeder constructed in accordance with the present invention and comprising a hopper 2, a feeding pan and distributing chute unit 3, and a vibratory actuator 4.

The hopper 2 is shaped to promote gravitational flow of sawdust therein and includes a relatively perpendicular front wall 5 having downwardly converging side edges connected with downwardly and inwardly sloping side walls 6 and 7. The rear edges of the side walls slope downwardly toward the front wall 5 and are connected by a rear wall 8 to form an enclosure of rectangular cross section and varying in capacity from a relatively large open top 9 to a relatively smaller open bottom 10. The upper edges of the side walls are reinforced by a band 11 extending around the top opening 9 and providing stiffened support for spaced hangers 12 and 13 attached to the wall 5. The hangers are of angle shape and have projecting arms 14 adapted to be attached to a part of the smoke generator as hereinafter described. The lower end of the wall 5 is provided with a spacing bracket 15 including a transverse portion 16 fixed to the wall 5 of the hopper, as by welding or the like, and which has spacing portions 17 terminating in ears 18 adapted to bear upon a side of the smoke generator casing as hereinafter described.

The unit 3 includes a pan-like member 19 having a rectangular bottom 20 extending under the bottom opening 10 of the hopper and having upwardly diverging sides 21 and 22 connected along the rear end of the bottom by an end wall 23. The forward or discharge end 24 of the feeding pan is open. The sides 21 and 22 thereof are notched as at 25 to reduce the size of the opening required in passing the discharge end 24 of the pan 19 into the generator casing as later described. Extending downwardly at an incline from the discharge end 24 of the feeding pan is a distributing chute 26 which may be formed as a continuation of the bottom 20 of the feeding pan 19 and which is provided with perforations arranged therein to give the desired distribution of the sawdust into the sawdust pan or drawer of the generator. In the form illustrated the lower end of the distributing chute is provided with a group 27 of apertures arranged in longitudinal and transverse rows as best shown in Fig. 3 while the upper portion of the chute is provided with a longitudinal row of perforations 28 in the median line of the chute and converging rows of openings 29 and 30 starting adjacent sides 31 and 32 of the chute portion and terminating at substantially the center thereof. This arrangement of apertures is found to give the desired distribution of the sawdust material in the generating pan for promoting proper combustion of the sawdust and maintaining a substantially uniform generation of the smoke. However, other arrangements of apertures may be used if desired. The chute may also be of sufficient length to carry the sawdust to the location of the smoke generating pan in the smoke generator casing.

In order to prevent clogging of the sawdust outlet between the feeding pan and hopper the feeding pan is supported with the bottom thereof at a substantial distance below the lower edges of the hopper walls to permit lumps of sawdust to work thereunder. Therefore, to provide for the proper feed of sawdust from the feeding pan the space is kept closed by an accumulated body of sawdust. This is effected by a transverse baffle or weir 33 that extends transversely across the bottom of the feeding pan and has a forwardly and downwardly curved lip 34 across which the sawdust drops onto the discharge end of the pan. The baffle is spaced forwardly from the plane of the rear wall of the hopper and has a flange portion 35 by which it is attached to the bottom of the pan portion by spot welding or the like.

The feeder portion of the assembly is suspended below the bottom opening of the hopper by means of short or long pairs of links or straps 36—37 and 38—39 on the respective sides of the hopper. The short links 36 and 37 have their upper ends rigidly attached to the side walls 6 and 7 of the hopper near the sloping side 8 by fastening devices such as screws 40 and 41 that extend through suitable openings in the links, through openings of resilient washers 42 and into the wall of the hopper. The links 36 and 37 extend downwardly in substantially parallel relation with the wall 8 and pivotally connect with the sloping sides 21 and 22 of the feeding pan 19 by fastening devices such as screws 43. The longer links 38 and 39 have their upper ends pivotally connected to the side walls of the hopper at a point above the ends of the shorter links and substantially midway of the width of the side walls 6 and 7 by fastening devices such as screws 44, resilient washers 45 being inserted as in the connection of the shorter links. The lower ends of the longer links are provided with slots 46 and are connected with the discharge end of the feeding pan 19 by fastening devices such as screws 47 extending through the slots 46 and into the sloping sides 21 and 22 of the pan portion. Washers 48 are preferably used between the heads of the screws and the slotted ends of the links.

Mounted on the under side of the feeding pan is a vibrator 49 preferably of electrical type and having a foot 50 that is secured to the pan portion 19 by a bolt 51 extending through the foot, through an opening in the bottom 20 and through a vibrator mounting plate 52 seated on the inner surface of the pan. The vibrator 49 is positioned so that it is located substantially under the ends of the shorter links 36 and 37 where it provides satisfactory balance and optimum vibration of the feeding pan to effect advance of the sawdust toward the weir 33. When thus mounted, the rear end projects beyond the rear wall 8 and the projecting portion of the feeding pan is covered by a hood 53 that is carried by the rear wall 8 of the hopper and has depending side and ends spaced in overlapping relation with the corresponding side walls of the pan portion to permit free vibration without interference by the hood. The vibrator 49 is supplied with a pulsating current, for example an alternating current, by conductors 54 and 55 and connected in circuits therewith is a rheostat 56 by which the intensity of the current may be regulated to vary selectively the intensity of the vibrations applied to the feeding pan. A sieve 57 may be furnished with the hopper which is adapted to be suspended within the open top by hangers 58.

The feeder constructed and assembled as described is adapted to be used in converting a smoke generator to automatic feed of the sawdust or the feeder may be furnished as a part of a generator and applied thereto as now to be described.

The smoke generator shown in the drawings includes a wall 59 having an opening 60 therein adapted to pass a drawer or pan 61 into the smoke generating compartment 62 thereof, the drawer being located over a gas-burner 63 or other heat source arranged to effect combustion of the sawdust and generation of smoke which is discharged from the generator to the smoke chamber (not shown) or other place in which the food product is to be treated.

In mounting the feeder a substantially U-shaped opening 64 is provided in the wall of the smoke generator above the drawer opening. The opening 64 is of a width to freely accommodate the discharge end of the feeding pan 19 and has upwardly diverging terminals 65 and 66 to accommodate the notched ends of the sides 21 and 22. The hangers 12 and 13 are suitably attached to the casing of the generator so that the hopper is supported in proper position and with the spacer 15 bearing against the wall 59 of the generator casing as shown in Fig. 2.

When the feeder is to be placed in operation the hopper is filled with sawdust, the sieve 57 being used to exclude excessively large particles of sawdust. The sawdust flows through the open bottom 10 of the hopper and collects in a pile on the bottom of the feeding pan between the end wall 23 and the weir 33. The vibrator 49 is then placed in operation through connection with a source of alternating current supply through the conductors 54 and 55 so as to effect variation of the feeding pan and distributor chute which also effects vibration of the hopper to promote gravity feed of the sawdust therein, and accumulation of a bed of sawdust in the feeding pan up to the lower edges of the hopper walls and to the height of the weir 33. The vibrations effect consolidation of the bed of sawdust to provide an exposed surface 67 (see Fig. 5) across which grains of the sawdust move from the hopper to the weir. The rate of travel of the grains or particles may be regulated according to the character of the sawdust by raising or lowering the discharge end of the feeding pan relatively to the hopper which changes the angle of inclination of the surface 67, the greater the angle the faster the feed and the smaller the angle the slower the feed. The adjustment is effected by loosening the fastening devices 47 and pivoting the feeding pan upwardly or downwardly on the pivoted connections of the shorter links. When the desired rate of feed is attained the fastening devices 47 are retightened to maintain the adjustment. The particles of sawdust then travel across the surface 66 in a thin stream for movement down the inclined perforated bottom of the distributor chute 26 which vibrates with the feeding pan to sift sawdust through the openings and to effect distribution of sawdust in the generator pan or drawer as controlled by the above mentioned arrangement of perforations.

When the feed is established, final adjustment in the rate of feed is attained by manipulating the rheostat 56 so that the amplitude of the vibrations are such that the feeding rate is not faster than the sawdust will burn in the generator.

One method of gaining the proper feed is to adjust the rate so that the particles falling over the lip of the weir 33 may be counted and the speed is then increased just above the point where the grain can be counted. When the grains or particles are thus fed into the combustion zone they are immediately ignited and the resulting smoke is uniformly discharged from the generator at proper density. It is also impossible for unburned sawdust to accumulate within the smoke generating pan with the result that all the particles are effective in production of smoke. Individual combustion of the sawdust particles results in substantially perfect combustion and only a relatively small amount of ash accummulates in the generating pan.

If on change of the quality of sawdust it is desired to increase the rate of feed for maintaining a given smoke density this may be effected by regulating the rheostat 56 or by changing the adjustment of the feeding pan to give a greater angle of slope to the feeding surface 67 of the sawdust bed in the feeding pan. To reduce the smoke density the feeding rate is reduced by turning the rheostat in the opposite direction or adjusting the feeding pan to give less slope to the feeding surface 67.

If a lump of sawdust should result at the discharge end of the hopper it works freely through the bed of sawdust and is easily discharged from the feeding pan. Vibration of the hopper is important because the material cannot bridge therein and stop the flow into the feeding pan.

While the invention is particularly described for feeding sawdust it is obvious that the feeder may be adapted to other purposes where an extremely accurate control of the feeding rate is required.

From the foregoing it is obvious that I have provided a feeder for the continuous movement of sawdust into a smoke generator and which is of simple construction, positive in operation, and well adapted for effecting feed in a manner as to obtain substantially uniform smoke generation, which results in a uniform supply of smoke to the treating chamber.

What I claim and desire to secure by Letters Patent is:

1. In a feeding apparatus of the type comprising a hopper having an open bottom for passing material from the hopper, a feeding member directly supported below the hopper opening and a vibrator connected with the feeding member for vibrating the feeding member to effect feed of said material, said feeding member including a pan having an open end, a weir extending across the pan near the open end thereof and having its upper edge spaced below and forwardly from the hopper opening for retention of a bed of material in the pan and across which the material passes incidental to vibration produced in said vibrator, a distributor bodily connected with the open end of the pan and angularly sloping therefrom in a downward direction and having a perforated bottom for effecting distribution of the material discharged over said weir, links having rigid connection with opposite sides of the hopper and pivotal connection with the pan near the transverse median line of said pan and whereon the pan is adapted to be pivoted, and links cooperating with the first named links to support the pan for said vibratory movement, said last named links having pivotal connection with the sides of the hopper forwardly of the fixed connection of the first-named links and having lower ends adjustably connected with the respective sides of the pan in registry with ends of the weir to change the angle of the pan and the position of the weir relatively to the hopper for effecting change in the surface of the bed of material which is retained by the weir and across which the material travels to said distributor.

2. In a feeding apparatus of the type comprising a hopper having an open bottom for pasing material from the hopper, a feeding member directly supported below the hopper opening and a vibrator connected with the feeding member for vibrating the feeding member to effect feed of said material, said feeding member including a pan having an open end, a weir extending across the pan near the open end thereof and having its upper edge spaced forwardly from the hopper opening for retention of a bed of material in the pan and across which the material passes incidental to vibration produced in said vibrator, a distributor bodily connected with the open end of the pan and angularly sloping therefrom in a downward direction and having a perforated bottom for effecting distribution of the material discharged over said weir, said pan having a portion extending rearwardly from the direction of the distributor for enlarging the bed of material to balance the distributor, links having fixed connection with the hopper and pivotal connection with opposite sides of the pan substantially midway between the rear end of the pan and the weir, and links having pivoted connection with the hopper and adjustable connection with the opposite sides of the pan and in registry with ends of the weir for cooperation with the first named links in supporting the feeder for said vibratory movement and to effect adjustment of the position of the weir relatively to the open end of the hopper to regulate rate of feed of the material across the surface of said bed of material.

References Cited in the file of this patent

UNITED STATES PATENTS

| Number | Name | Date |
| --- | --- | --- |
| 440,920 | Lash | Nov. 18, 1890 |
| 652,531 | Carlson | June 26, 1900 |
| 833,761 | Stevens | Oct. 23, 1906 |
| 1,088,441 | Morrow | Feb. 24, 1914 |
| 1,133,888 | Schwenger | Mar. 30, 1915 |
| 1,858,328 | Heymann et al. | May 17, 1932 |
| 2,100,878 | Shallock | Nov. 30, 1937 |
| 2,181,205 | Rigor | Nov. 28, 1939 |
| 2,187,717 | Weyandt | Jan. 23, 1940 |
| 2,289,942 | Tafel | July 14, 1942 |
| 2,389,566 | Thomas | Nov. 20, 1945 |

FOREIGN PATENTS

| Number | Country | Date |
| --- | --- | --- |
| 422,866 | Germany | Dec. 16, 1925 |